United States Patent [19]

Wikelski et al.

[11] Patent Number: 5,059,662

[45] Date of Patent: Oct. 22, 1991

[54] METHOD FOR PRODUCING ETHYLENE COPOLYMER

[75] Inventors: Karl W. Wikelski, Odessa, Tex.; Shinji Kojima, Yokohama, Japan

[73] Assignees: Resene Products Company, Odessa, Tex.; Nippon Petrochemicals Co. Ltd., Tokyo, Japan

[21] Appl. No.: 484,920

[22] Filed: Feb. 26, 1990

Related U.S. Application Data

[63] Continuation-in-part of Ser. No. 436,090, Nov. 13, 1989, abandoned, which is a continuation of Ser. No. 52,298, May 21, 1987, abandoned.

[30] Foreign Application Priority Data

Jan. 29, 1987 [JP] Japan ................................ 62-019430

[51] Int. Cl.$^5$ ............................................ C08F 210/02
[52] U.S. Cl. .................................... 526/208; 526/209; 526/210; 526/217; 526/220; 526/222; 526/273; 526/89
[58] Field of Search ................. 526/84, 273, 209, 210, 526/220, 208, 217, 222, 89

[56] References Cited

U.S. PATENT DOCUMENTS

| | | | |
|---|---|---|---|
| 2,556,075 | 6/1951 | Erickson | 526/273 X |
| 3,383,372 | 5/1968 | Spivey | 526/273 X |
| 4,388,448 | 6/1983 | Melby | 526/273 X |
| 4,721,761 | 1/1988 | Omae et al. | 526/64 |

FOREIGN PATENT DOCUMENTS

| | | | |
|---|---|---|---|
| 019430 | 1/1987 | Japan | 526/273 |
| 1003935 | 9/1965 | United Kingdom | 526/273 |

OTHER PUBLICATIONS

English translation of Japanese Kokai Patent No. 48-89236 to Takasaka et al., published 11/21/73.

*Primary Examiner*—Fred Teskin
*Attorney, Agent, or Firm*—Harold E. Meier

[57] ABSTRACT

A method for producing ethylene copolymer using ethylene and at least a comonomer of unsaturated glycidyl monomer in the presence of a polymerization initiator, wherein the undesirable thermal polymerization of the unsaturated glycidyl monomer in the preparation system can be avoided and the operation can be continued for a long period of time in a stable condition. The method is characterized in that at least two kinds of polymerization inhibitors are used and the inhibition factor of one polymerization inhibitor added to the unsaturated glycidyl monomer is smaller than that of another polymerization inhibitor added to the lubricating oil for compressors and the unsaturated glycidyl monomer containing 100 to 2000 ppm of a polymerization inhibitor is introduced from the inlet side of a high pressure compressor into the reaction system and the lubricating oil containing 0.1 to 10% by weight of a polymerization inhibitor is used for the high pressure compressor.

13 Claims, No Drawings

METHOD FOR PRODUCING ETHYLENE COPOLYMER

RELATED APPLICATION

This application is a continuation-in-part of application Ser. No. 436,090, filed Nov. 13, 1989, now abandoned, which was a file wrapper continuation of application Ser. No. 052,298, filed May 21, 1987, now abandoned.

BACKGROUND OF THE INVENTION

1. Field of the Invention

This invention relates to an improved method for producing ethylene copolymer. More particularly, the present invention relates to a method for producing ethylene copolymer containing unsaturated glycidyl monomer as one component. Furthermore, the invention relates to the prevention of the occurrence of polymerization of an ethylene mixture containing unsaturated glycidyl monomer in a compressor and the piping system from the compressor to a reactor.

The ethylene copolymer obtained by the method of the present invention is suitable for use in preparing adhesives and coating materials. In addition, this ethylene copolymer can be mixed with other resins while retaining the excellent characteristics of polyethylene to provide useful resin compositions.

2. Description of Prior Art

The high pressure polymerization methods of ethylene copolymer containing unsaturated glycidyl monomer as one component are well known in the art according to Japanese Laid-Open Patent Publication Nos. 48-11388 and 48-89236, and Japanese Patent Publication Nos. 52-28836 and 58-55964.

For example, in Japanese Laid-Open Patent Publication No. 48-89236, methods for preparing copolymers consisting of three component materials of ethylene, vinyl acetate, and glycidyl methacrylate are disclosed. According to the disclosure in the former Japanese Laid-Open Patent Publication No. 48-89236, in the case that polymerization is carried out in a reactor, especially in a tubular reactor, the polymerization is done by adding 100 ppm to 1000 ppm of polymerization inhibitor to the solution of glycidyl ester, otherwise the blocking of polymerization tubes is caused to occur When the glycidyl ester is employed intact and continuous production of copolymer becomes impossible. Disclosed in Japanese Patent Publication No. 52-28836 is a method for preparing ethylene copolymer which is characterized in that one or more kinds of unsaturated glycidyl monomers are mixed into the gas that is compressed to reaction pressure and polymerization is then carried out.

In the method described in Japanese Laid-Open Patent Publication No. 48-89236, however, physically and chemically unstable polymer mainly consists of unsaturated glycidyl monomer deposits on cylinder packing portions of an ultra high pressure compressor which compresses it to a reaction pressure, disabling the long period operation of the reaction. Meanwhile, in the method described in Japanese Patent Publication No. 52-28836, because one or more kinds of glycidyl monomers are mixed into the gas that is compressed to reaction pressure, an expensive ultra high pressure pump is required which is uneconomical.

In the case when the conversion rate in a reactor is low, the concentration of unsaturated glycidyl monomer in the unreacted recycle gas that is separated by a high pressure separator, is raised. So that a polymer mainly consisting of unsaturated glycidyl monomer is produced in a compressor and the long period operation becomes impossible inadvantageously.

In Japanese Patent Publication No. 58-55964, a method for producing ethylene polymer or copolymer is disclosed. This method is characterized in that lubricating oil containing 0.1 to 10 ppm of a polymerization inhibitor relative to the quantity of ethylene or the mixture of ethylene and ethylene-copolymerizable comonomer, is used. The undesirable thermal polymerization in the compressor can be avoided by this method. However, the quantity of the lubricating oil discharged outside the system as the drain of the compressor is large because the molecular weight of lubricating oil is generally high, and when the reactor is a tubular type one, the method cannot be said satisfactory for avoiding undesirable thermal polymerization in the preheating zone which heats the mixture of ethylene and unsaturated glycidyl monomer to reaction temperature. Furthermore, it is necessary to avoid the polymerization in the feeding line and feed pump prior to the reaction system because the polymerization of unsaturated glycidyl monomer is liable to occur; however, this method is not effective at all in this regard.

Japanese Patent Publication No. 59-80407 (claiming Convention Priority of U.S. Ser. No. 426,409; Sept. 29, 1982) or British Patent Application No. 2,128,198A discloses a high pressure polymerization process which comprises the step of compressing monomer feed before introducing it into a polymerization zone wherein it undergoes high pressure polymerization wherein the monomer feed is compressed to reaction pressure in a compressor having at least one compression stage and at least one lubricated compressor cylinder assembly provided with a lubricant containing from 3 wt. % to 10 wt. % of an antioxidant, thereby reducing gas leakage from the compressor. The undesirable thermal polymerization in the compressor can be avoided by this method; however, the method is not satisfactory in order to avoid the undesirable thermal polymerization in the preheating zone in which the mixture of ethylene and unsaturated glycidyl monomer is heated to reaction start temperature.

Furthermore, Japanese Laid-Open Patent Publication No. 61-127709 discloses that the void portions of packing and retainer of an ultra high pressure pump for comonomers are filled with grease-like oil which contains 2% to 20% by weight of a polymerization inhibitor and, if necessary, 100 to 5000 ppm (weight basis) of a polymerization inhibitor is added to the lubricating oil for the ultra high pressure pump.

By these methods, however, it is not possible to solve effectively the problems to avoid the thermal polymerization in a high pressure compressor, in the outlet piping of the compressor and in the preheating zone and to reduce the retarding effect of the polymerization inhibitor in the reaction vessel.

BRIEF SUMMARY OF THE INVENTION

It is, therefore, the primary object of the present invention to provide an improved method for producing ethylene copolymer.

Another object of the present invention is to provide the method for producing ethylene copolymer from ethylene and at least a comonomer of unsaturated glycidyl monomer in the presence of a polymerization initiator, wherein the undesirable thermal polymerization of the unsaturated glycidyl monomer in the preparation system except in a reaction vessel can be avoided.

A further object of the present invention is to provide the method for producing ethylene copolymer using polymerization inhibitors wherein the method can be continued for a long period of time in a stable condition.

Still a further object of the present invention is to provide the method for producing ethylene copolymer using polymerization inhibitors wherein the undesirable effect of the polymerization inhibitor to retard the aimed polymerization in a reaction vessel is suppressed.

These and other objects and features of the present invention will be more clearly apparent from the following detailed description.

DETAILED DESCRIPTION OF THE INVENTION

In accordance with the present invention there is provided an improvement in a method for producing ethylene copolymer by copolymerization of ethylene with at least a comonomer of unsaturated glycidyl monomer using a polymerization apparatus equipped with at least one high pressure compressor, outlet piping and a polymerization zone, the polymerization being conducted at pressures in the range of 500 to 4000 kg/cm$^2$ and at polymerization temperatures in the range of 100° C. to 330° C. in the presence of a polymerization initiator, the improvement in the method which is characterized in that at least two polymerization inhibitors are used and the inhibition factor of polymerization inhibitor added to said unsaturated glycidyl monomer is in the range of 0.001 to 0.49 sec/ppm and is smaller than that of another polymerization inhibitor added to the lubricating oil for said compressor as compared at the same temperature and the same concentration, said one polymerization inhibitor used for said unsaturated glycidyl monomer is selected from the group consisting of hydroquinone monomethyl ether, p-tert-butylcatechol, di-tert-butyl-p-cresol, 2-amino-1,4-naphthoquinone, 1-amino-4-hydroxyanthraquinone, N-nitrosodimethylamine, benzenethiol, phenyl hydrazine and divinylacetylene, said unsaturated glycidyl monomer containing 100 to 2000 ppm of said one polymerization inhibitor is mixed with ethylene and then introduced from the inlet side of said high pressure compressor through the outlet piping into the polymerization zone and said lubricating oil containing 0.1% to 10% by weight of said another polymerization inhibitor is used for said high pressure compressor.

When the copolymerization of ethylene is carried out, it is necessary to avoid the undesirable thermal polymerization in the process such as in a high pressure compressor and in the outlet piping of the compressor except in the reaction vessel.

As one of the effective measures in this regard, the selection of the combination of polymerization inhibitors, one is added to the unsaturated glycidyl monomer and other is added to the lubricating oil for the high pressure compressor, is important. In other words, the induction period of the polymerization inhibitor added to the comonomer must be short in order to reduce possibly the retarding effect in the reaction vessel. Meanwhile, as the lubricating oil undergoes the high temperature and high pressure conditions under the reciprocation of the plungers of the high pressure compressor, it is necessary that the polymerization inhibitor for the lubricating oil has a relatively long induction period and be effective at high temperatures.

That is, the induction period of the polymerization inhibitor for the lubricating oil of compressors must be longer than that of the inhibitor for the unsaturated glycidyl monomer at the same temperature and the same concentration, which fact requires that at least two kinds of polymerization inhibitors must be used simultaneously. More particularly, the inhibition factor of a polymerization inhibitor which is added to lubricating oil is preferably in the range of 0.5 to 1.5 sec/ppm and the inhibition factor of the polymerization inhibitor which is added to unsaturated glycidyl monomer is in the range of 0.001 to 0.49 sec/ppm.

The determination of the inhibition factor of a polymerization inhibitor is carried out as follows [J. Appl. Polymer Sci., 8, 503–509 (1964)]:

A 10 ml portion of methylmethacrylate containing a polymerization inhibitor is heated with 0.0400 g of benzoyl peroxide in a test tube immersed in a bath at 101.2° C., until a spontaneous boil occurs. The time (sec.) until the boil is divided by the concentration (ppm) of the polymerization inhibitor to give an inhibition factor.

This inhibition factor is closely related to the induction period. That is, a larger inhibition factor indicates a longer induction period.

In accordance with the present invention, by the appropriate combination of polymerization inhibitors, the thermal polymerization of unsaturated glycidyl monomer in a high pressure compressor and in its outlet piping can be avoided, which provides stable and continuous long period operation of the polymerization process.

Furthermore, even when a relatively highly active polymerization inhibitor is used for the lubricating oil, it does not have influence on the polymerization in the reaction vessel because the molecular weight of lubricating oil is relatively high in general and it is separated from the monomer by being discharged from the system as drainage when it is compressed by a high pressure compressor.

Another effective measure to avoid the undesirable polymerization according to the present invention is the selection of quantities of the polymerization inhibitors. That is, the quantity of a polymerization inhibitor previously added to the unsaturated glycidyl monomer is 100 to 2000 ppm, preferably 300 to 1000 ppm relative to the weight of the unsaturated glycidyl monomer. If the quantity of the polymerization inhibitor is less than 100 ppm, the undesirable polymerization of the unsaturated glycidyl monomer cannot be avoided to make the process difficult to obtain the copolymer stably. On the other hand, if the addition of the polymerization inhibitor is more than 2000 ppm, the reaction becomes unstable due to the retarding effect in the polymerization stage caused by the residual polymerization inhibitor.

In the method of the present invention, the quantity of a polymerization inhibitor that is added to the lubricating oil is varied according to the kind of polymerization inhibitor, the temperature of the outlet gas from a high pressure compressor and the quantity of lubricating oil that is unavoidably mixed into the reaction system. In ordinary cases, 0.1% to 10% by weight of the polymerization inhibitor is added to the lubricating oil. When this quantity is less than 0.1% by weight, the prevention of the undesirable thermal polymerization within the compressor and in the outlet piping thereof is not satisfactory. Meanwhile, if the quantity is more than 10% by weight, the reaction becomes unstable due to the retarding effect of the polymerization inhibitor.

The unsaturated glycidyl monomers are compounds having one unsaturated bond that is copolymerizable with ethylenic monomer and one or more epoxy groups per one molecule. They are exemplified by glycidyl acrylate, glycidyl methacrylate, glycidyl ethacrylate, glycidyl crotonate, itaconic acid monoglycidyl ester, itaconic acid diglycidyl ester, butene tricarboxylic acid monoglycidyl ester, butene tricarboxylic acid diglycidyl ester, butene tricarboxylic acid triglycidyl ester, p-styrene carboxylic acid glycidyl ester, and p-glycidyl styrene.

The foregoing copolymer of ethylene and the comonomer is prepared by copolymerizing 50% to 99.95% by weight of ethylene and 0.05% to 50% by weight of the unsaturated glycidyl monomer.

The ethylene copolymers of the present invention include not only the copolymers of ethylene with an unsaturated glycidyl monomer but also the copolymers containing ethylene copolymerizable ethylenically unsaturated monomers beside the unsaturated glycidyl monomer. Ethylenically unsaturated monomers are exemplified by vinyl esters of saturated carboxylic acids having 2 to 6 carbon atoms such as vinyl acetate, vinyl propionate and vinyl benzoate; esters of acrylic acid or methacrylic acid with saturated alcohols having 1 to 18 carbon atoms, such as methyl-, ethyl-, propyl-, butyl-, 2-ethylhexyl-, cyclohexyl-, dodecyl-, and octa-decyl- esters; maleic anhydride; mono- or di-esters of maleic acids with the saturated alcohols having 1 to 18 carbon atoms, such as methyl-, ethyl-, butyl-, cyclohexyl-, 2-ethylhexyl-, dodecyl-, and octadecyl- mono- or di-esters; styrenes; vinylchloride; vinyl ethers such a methyl vinyl ether and ethyl vinyl ether; N-vinyl lactams such as N-vinylpyrrolidone and N-vinylcaprolactam; acrylic amide compounds; sec-vinyl carboxylic acid amides; and N-vinyl-N-alkylcarboxylic acid amides. Among the above ethylenically unsaturated monomers, vinyl acetate, acrylic acid esters and methacrylic acid esters are especially preferable.

The addition quantity of the foregoing ethylenically unsaturated monomers is in the range of 0% to 49.95% by weight relative to the sum of the ethylene and the unsaturated glydicyl monomer.

The MFI (melt flow index) of the copolymer prepared by the method of the present invention is in the range of 0.1 to 100 g/10 min., and preferably in the range of 0.3 to 50 g/10 min.

The ethylene copolymer of the present invention is prepared by copolymerization using a polymerization apparatus having high pressure compressors in the presence of a radical polymerization initiator, in the presence or absence of a solvent and, if necessary, using a chain transferring agent, and under the conditions of polymerization pressures of 500 to 4000 kg/cm$^2$, preferably 1000 to 4000 kg/cm$^2$, and polymerization temperatures of 100° C. to 330° C., preferably to 120° C. to 300° C.

Suitable polymerization initiators are exemplified by hydrogen peroxide; oxygen; organic peroxides such as diethyl peroxide, tert-butyl hydroperoxide, di-tert-butyl peroxide, dicumyl peroxide, tert-butyl peroxybenzoate, tert-butyl peroxyacetate, tert-butyl peroxy-2-ethylhexanoate, tert-butyl peroxypivalate, 2-ethylhexanoyl peroxide, pivalyl peroxide, and isopropyl peroxydicarbonate; and azo compounds such as azobisisobutyronitrile. azobis-2,2-diphenylacetonitrile.

The chain transferring agents are exemplified by paraffins such as ethane, propane, butane, pentane, hexane and heptane; α-olefins such as propylene, butene-1, hexene-1, and 3-methylpentene-1; aldehydes such as formaldehyde, acetaldehyde, and propionaldehyde; ketones such as acetone, methyl ethyl ketone, diethyl ketone, and cyclohexanone; and aromatic hydrocarbons such as benzene, toluene, and xylene.

As a polymerization apparatus for carrying out the method of the present invention, the ordinary continuous high pressure polyethylene production apparatus is suitable; however, batchwise apparatus can also be employed. The reaction vessels may be either tanklike ones or tubular ones.

The polymerization inhibitors used in the method of the present invention are nuclear substituted phenol and bisphenol. The substituent groups of them are at least one member selected from the group consisting of hydroxy, carboxyl, carbonyl, nitro, amino, amino lower alkyl, lower alkyl amino, lower alkyl, lower alkenyl, lower alkoxy and lower alkacyl groups.

Preferable polymerization inhibitors which are dissolved in lubricating oils are those having an inhibition factor in the range of 0.5 to 1.5 sec/ppm, as described in the foregoing paragraph. More particularly, they are exemplified by hydroquinone (0.65 sec/ppm), 1-amino-7-naphthol (0.51 sec/ppm), p-benzoquinone (0.86 sec/ppm), 2,6-dichloro-p-benzoquinone (1.00 sec/ppm), diphenylamine (0.5 sec/ppm), p-nitrosodimethylaniline (0.64 sec/ppm), α-naphthylamine (0.57 sec/ppm) and β-naphthylamine (0.53 sec/ppm).

While, preferable inhibition factors of the polymerization inhibitors that are dissolved in unsaturated glycidyl are in the range of 0.001 to 0.49 sec/ppm. More particularly, they are exemplified by p-tert-butylcatechol (0.47 sec/ppm), hydroquinone monomethyl ether (0.28 sec/ppm), di-tert-butyl-p-cresol (0.007 sec/ppm), 2-amino-1,4-naphthoquinone (0.11 sec/ppm), 1-amino-4-hydroxyanthraquinone (0.088 sec/ppm), N-nitrosodimethylamine (0.008 sec/ppm), benzenethiol (0.105 sec/ppm), phenyl hydrazine (0.31 sec/ppm) and divinylacetylene (0.26 sec/ppm).

Furthermore, the lubricating oils suitably used for high pressure compressors are exemplified by quality mineral oils and polybutene, poly-α-olefin and polyalkylene glycol.

In the working of the method of the present invention, the following is one of the most desirable combinations of the foregoing polymerization inhibitors and lubricating oil:

hydroquinone monomethyl ether (MEHQ) as a polymerization inhibitor having relatively short induction period used for an unsaturated glycidyl monomer, hydroquinone (HQ) as a polymerization inhibitor having relatively long induction period used for a lubricating oil, and polyalkylene glycol as a desirable lubricating oil used in combination with hydroquinone.

According to the method of the present invention as described above, the undesirable polymerization of unsaturated glycidyl monomer in the feeding line, the feeding pump and the preheating zone of the tubular reaction vessel can be avoided; however, the polymerization in the reaction vessel is not retarded by these polymerization inhibitors, thereby accomplishing continuous, long period and stable operation of the polymerization.

The features and advantages of the present invention will be described in more detail with reference to examples and comparative examples. It should be noted, however, that the present invention is by no means restricted by these examples.

EXAMPLE 1

To a tanklike reaction vessel were fed 12,700 kg/hr of ethylene, 1.3 mole % (to ethylene) of propylene, and 102 kg/hr of glycidyl methacrylate containing 1000 ppm of hydroquinone monomethyl ether (inhibition factor: 0.28 sec/ppm) as a polymerization inhibitor by using reciprocating high pressure compressors. Adding 2 kg/hr of tert-butylperoxy-2-ethylhexanoate as a polymerization initiator to the reaction vessel, polymerization was carried out continuously at a reaction pressure of 1750 kg/cm and a reaction temperature of 210° C. to 220° C.

Under these conditions, 2000 kg/hr of a copolymer containing 5 wt. % of glycidyl methacrylate was obtained. The density of the product was 0.930 g/cm$^3$ and the melt flow index was 4 g/10 min.

As the lubricating oil of the ultra high pressure compressor, polyglycol (trademark: Ucon PE-320, made by Union Carbide and Carbon Corporation) containing 2.2 wt. % of hydroquinone (inhibition factor: 0.65 sec/ppm) as a polymerization inhibitor was used. The use quantity of the lubricating oil was 1.95 kg/hr. Under the above conditions, the operation was monitored for signs of unusual pressure increases at the feeding pipe of glycidyl methacrylate, the piping for lubrication oil and the outlet pipe of the compressor. The operation was completely trouble-free and was voluntarily discontinued after 48 hours.

EXAMPLE 2

An ethylene copolymer containing 10 wt. % of glycidyl methacrylate was prepared in the like manner as in Example 1 except that the feed of glycidyl methacrylate was increased to 204 kg/hr. As a result, the polymerization was continued for 48 hours without any unusual increase in pressure.

EXAMPLE 3

An ethylene copolymer containing 15 wt. % of glycidyl methacrylate was prepared in the like manner as in Example 1 except that the feed of glycidyl methacrylate was increased to 306 kg/hr. As a result, the polymerization was continued for 48 hours without any unusual increase in pressure.

EXAMPLE 4

An ethylene copolymer containing 5 wt. % of glycidyl methacrylate and 10 wt. % of ethylacrylate was prepared in the like manner as in Example 1 except that the feed of glycidyl methacrylate was changed to 102 kg/hr and 230 kg/hr of ethylacrylate as an ethylenically unsaturated monomer was used together. As a result, the polymerization was continued for 48 hours without any unusual increase in pressure.

COMPARATIVE EXAMPLE 1

This example was carried out under conditions identical to those of the above Example 1 except that the hydroquinone having a high inhibition factor (0.65 sec/ppm) was now added to the glycidyl monomer instead of to the lubricating oil, while the hydroquinone monomethyl ether having a low inhibition factor (0.28 sec/ppm) was added to the lubricating oil instead of to the glycidyl monomer. However, as in Example 1, the inhibitor concentration in the glycidyl methacrylate was maintained at 1000 ppm, and in the lubricating oil at 2.2 wt. %

Although there was no indication of pressure rise owing to polymer formation in the glycidyl methacrylate feed line and in the compressor outlet piping, the temperature in the reactor became unstable which necessitated to double the polymerization initiator concentration.

Also, after 40 hours of operation, the reaction had to be stopped because of excessive gas leakage from the cylinder packing in the high pressure compressor. Inspection of the disassembled compressor showed considerable accumulation of polymer in the cylinder packing area.

A comparison of the results from Example 1 according to the present invention and the Comparative Example 1, shows conclusively that when the inhibition factors (IF) of the polymerization inhibitors for the comonomer and the lubricating oil were reversed, i.e., IF: comonomer>lubricating oil, the polymerization reaction was unstable, the quantity of initiator must be increased, excessive compressor gas leakage occurred and operations had to finally be discontinued due to unwanted polymerization in the compressor cylinder packing area. However, operations of Example 1 in accordance with the claimed invention was completely trouble-free and was voluntarily discontinued.

COMPARATIVE EXAMPLE 2

An ethylene copolymer containing 10 wt. % of glycidyl methacrylate was prepared in the like manner as in Example 1 except that the content of the polymerization inhibitor in glycidyl methacrylate was 50 ppm of hydroquinone monomethyl ether. After the polymerization was continued for 30 hours, unusual increase in pressure was caused to occur in the feed pump for glycidyl methacrylate and the feeding became impossible. The pump was then stopped and checked by disassembling. As a result, some polymer was observed in the pump body.

COMPARATIVE EXAMPLE 3

An ethylene copolymer containing 10 wt. % of glycidyl methacrylate was prepared in the like manner as in Example 1 except that the lubricating oil for an ultra high pressure compressor contained no polymerization inhibitor. After the polymerization was continued for 40 hours, the polymerization was stopped because gas leakage in the cylinder packing portion of the ultra high pressure compressor was observed and it increased. The pump was then stopped and checked by disassembling, wherein some polymer was observed in the cylinder packing portion of the compressor.

As described above, according to the present invention, it is possible to avoid the undesirable polymerization not only in the high pressure compressor and its outlet piping but also in the feed pump for unsaturated glycidyl monomer and its outlet piping. When the reaction vessel is a tubular type one, it is also possible to avoid the sticking of polymer to inside walls by inhibiting undesirable polymerization in the preheating zone in which the mixture of ethylene and unsaturated glycidyl is heated to a reaction temperature.

As a result, the operation for a long period of time becomes possible giving economical advantages. The ethylene copolymer obtained by the method of the present invention can be used as adhesive layers of laminated materials as it has adhesiveness, not to speak of the uses for films, sheets, pipes and hollow bottles through extrusion, injection and blow molding. The substrate substances of the laminated materials are not restricted and they are exemplified by thermoplastic resins, metals, paper, cloth, wood, glass, rubber, and thermosetting resins. Among them, the thermoplastic resins which are suitable for use in preparing food packages, are preferable. Furthermore, the copolymer of the present invention is also useful for improving or modifying physical properties, chemical properties, moldability, workability, etc. of several engineering plastics such as polycarbonate, polyacetal, polyamide, polyphenylene oxide, polybutylene terephthalate, polyethylene terephthalate, polyacrylate, polysulfone, polyphenylene sulfide, polyether imide, polyether sulfone, polyether ether ketone, polyamide imide, polyimide and polyaminobismaleimide, and their polymer alloy.

What is claimed is:

1. In a method for producing ethylene copolymer by copolymerization of ethylene with at least one comonomer of saturated glycidyl monomer using a polymerization apparatus equipped with at least one high pressure compressor, outlet piping and a polymerization zone, the polymerization being conducted at pressures in the range of 500 to 4000 kg/cm² and at polymerization temperatures in the range of 100° C. to 330° C. in the presence of a polymerization initiator, the improvement in the method which is characterized in that at least two polymerization inhibitors are used and the inhibition factor of one polymerization inhibitor added to said unsaturated glycidyl monomer is in the range of 0.001 to 0.49 sec/ppm and is smaller than that of another polymerization inhibitor added to the lubricating oil for said compressor as compared at the same temperature and the same concentration, said unsaturated glycidyl monomer containing 100 to 2000 ppm of said one polymerization inhibitor is mixed with ethylene and then introduced from the inlet side of said high pressure compressor through the outlet piping into the polymerization zone and said lubricating oil containing 0.1% to 10% by weight of said another polymerization inhibitor is used for said high pressure compressor.

2. The method for producing ethylene copolymer in claim 1, wherein the inhibition factor of said polymerization inhibitor added to a lubricating oil is in the range of 0.5 to 1.5 sec/ppm.

3. The method for producing ethylene copolymer in claim 1, wherein said polymerization inhibitor added to said unsaturated glycidyl monomer is hydroquinone monomethyl ether.

4. The method for producing ethylene copolymer in claim 1, wherein said polymerization inhibitor added to said lubricating oil is selected from the group consisting of hydroquinone, 1-amino-7-naphthol, p-benzoquinone, 2,6-dichloro-p-benzoquinone, diphenylamine, p-nitrosodimethylaniline, α-naphthylamine and β-naphthylamine.

5. The method for producing ethylene copolymer in claim 1, wherein said lubricating oil is polyalkylene glycol.

6. The method for producing ethylene copolymer in claim 1, wherein said ethylene copolymer comprises 50 to 99.5 parts by weight ethylene, 0.05 to 50 parts by weight of unsaturated glycidyl monomer and less than 49.95 parts by weight of ethylenically unsaturated monomer.

7. The method for producing ethylene copolymer in claim 1, wherein said unsaturated glycidyl monomer is glycidyl acrylate or glycidyl methacrylate.

8. The method for producing ethylene copolymer in claim 1, wherein said ethylenically unsaturated monomer is at least one member selected from the group consisting of vinyl acetate, methyl acrylate, methyl methacrylate, ethyl acrylate and ethyl methacrylate.

9. The method for producing ethylene copolymer in claim 1, wherein said polymerization inhibitor added to said lubricating oil is hydroquinone.

10. The method of claim 1 wherein said one polymerization inhibitor is selected from the group consisting of hydroquinone monomethyl ether, p-tert-butylcatechol, di-tert-butyl-p-cresol, 2-amino-1,4-naphthoquinone, 1-amino-4-hydroxyanthraquinone, N-nitrosodimethylamine, benzenethiol, phenyl hydrazine, and divinylacetylene.

11. A method for producing ethylene copolymer by copolymerization of ethylene with at least one comonomer of unsaturated glycidyl monomer using a polymerization apparatus equipped with at least one high pressure compressor, outlet piping and a polymerization zone, the polymerization being conducted at pressures in the range of 500 to 4000 kg/cm² and at polymerization temperatures in the range of 100° C. to 330° C. in the presence of a polymerization initiator, the process comprising:

adding from about 100 to about 2000 ppm of a first polymerization inhibitor to said glycidyl monomer, said first polymerization inhibitor having a polymerization inhibition factor of from about 0.001 to about 0.49 sec/ppm adding from about 0.1% to about 10% by weight of a second polymerization inhibitor to the lubricating oil for said compressor, said second polymerization inhibitor having a polymerization inhibition factor greater than the polymerization inhibition factor of said first polymerization inhibitor and within a range of from about 0.5 to about 1.50 ppm/sec.

mixing said unsaturated glycidyl monomer with ethylene and introducing the mixture from the inlet side of said high pressure compressor through the outlet side of said compressor through the outlet piping into the polymerization zone.

12. The method of claim 11 wherein said first polymerization inhibitor is selected from the group consisting of hydroquinone monomethyl ether, p-tert-butylcatechol, di-tert-butyl-p-cresol, 2-amino-1,4-naphthoquinone, 1-amino-4-hydroxyanthraquinone, N-nitrosodimethylamine, benzenethio, phenyl hydrazine, and divinylacetylene.

13. The method of claim 11, wherein said second polymerization inhibitor is selected from the group consisting of hydroquinone 1-amino-7-naphthol, p-benzoquinone, 2,6-dichloro-p-benzoquinone, diphenylamine, p-nitrosodimethylaniline, α-naphthylamine and β-naphthylamine.

* * * * *

UNITED STATES PATENT AND TRADEMARK OFFICE
CERTIFICATE OF CORRECTION

PATENT NO. : 5,059,662
DATED : October 22, 1991
INVENTOR(S) : Karl W. Wikelski, et al.

It is certified that error appears in the above-identified patent and that said Letters Patent is hereby corrected as shown below: Title page:

Under the heading "Assignees", change "Resene" to --Rexene--;
Column 9, line 23, "saturated" to --unsaturated--.

Signed and Sealed this

Thirteenth Day of April, 1993

Attest:

STEPHEN G. KUNIN

*Attesting Officer*  *Acting Commissioner of Patents and Trademarks*